(12) United States Patent
Ghidoni et al.

(10) Patent No.: US 7,279,504 B2
(45) Date of Patent: Oct. 9, 2007

(54) EXPANDABLE VINYLAROMATIC POLYMERS AND PROCESS FOR THEIR PREPARATION

(75) Inventors: Dario Ghidoni, Gonzaga-Mantova (IT); Roberto Lanfredi, Virgilio-Mantova (IT); Gilberto Frigerio, Curtatone-Mantova (IT); Alessandro Casalini, Mantova (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/488,298

(22) PCT Filed: Oct. 3, 2002

(86) PCT No.: PCT/EP02/10050

§ 371 (c)(1),
(2), (4) Date: Mar. 2, 2004

(87) PCT Pub. No.: WO03/035728

PCT Pub. Date: May 1, 2003

(65) Prior Publication Data

US 2004/0242713 A1    Dec. 2, 2004

(30) Foreign Application Priority Data

Oct. 18, 2001   (IT)  ............................ MI2001A2168

(51) Int. Cl.
*C08J 9/00* (2006.01)
*C08J 9/16* (2006.01)

(52) U.S. Cl. ............................ 521/56; 521/50; 521/82; 521/92; 521/142; 521/146

(58) Field of Classification Search .................. 521/50, 521/56, 82, 92, 142, 146
See application file for complete search history.

(56) References Cited

U.S. PATENT DOCUMENTS 3,072,581 A * 1/1963 Platzer ........................ 521/60
5,935,645 A   8/1999 Anfuso et al.
6,147,130 A   11/2000 Anfuso et al.

FOREIGN PATENT DOCUMENTS

| JP | 11 279319 | 10/1999 |
| JP | 11-279319 | * 10/1999 |
| JP | 200 017096 | 1/2000 |
| JP | 2002194129 A | * 7/2002 |

OTHER PUBLICATIONS

T. Whelan, Polymer Tchnology Dictionary, Chapman $ Hall, 1994, p. 141.*

* cited by examiner

*Primary Examiner*—Irina S Zemel
(74) *Attorney, Agent, or Firm*—Oblon, Spivak, McClelland, Maier & Neustadt, P.C.

(57) ABSTRACT

Expandable vinylaromatic polymers which comprise: a) a matrix obtained by polymerizing 50-100% by weight of one or more vinylaromatic monomers and 0.50% by weight of a copolymerizable monomer; b) 1-10% by weight, calculated with respect to the polymer (a), of an expanding agent englobed in the polymeric matrix; c) 0.05-25% by weight, calculated with respect to the polymer (a), of an inorganic filler homogeneously distributed in the polymeric matrix with a substantially spherical granulometry, an average diameter ranging from 0.01 to 100 μm, a refraction index higher than 1.6 and a white index, as defined in "Colour Index" (third edition published by the Society of Dyers and Colourists, 1982), equal to or lower than 22.

14 Claims, No Drawings

EXPANDABLE VINYLAROMATIC POLYMERS AND PROCESS FOR THEIR PREPARATION

The present invention relates to expandable vinylaromatic polymers and the process for their preparation.

More specifically, the present invention relates to a process for the preparation of expandable vinylaromatic polymers which, after expansion, have a reduced thermal conductivity also with a low density and to the products thus obtained.

Expandable vinylaromatic polymers, and among these expandable polystyrene in particular, are known products which have been used for a long time in various applicative sectors, among which one of the most important is the field of thermal insulation.

These expanded products are obtained by swelling in a closed mould beads of expanded polymer impregnated with a gas and molding the swollen particles contained inside the mould by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are usually used with a density of about 30 g/l as the thermal conductivity of the polymer shows a minimum at these values. It is not advantageous to fall below this density limit, even if it is technically possible, as it causes a drastic increase in the thermal conductivity of the sheet which must be compensated by an increase in its thickness.

U.S. Pat. No. 6,130,265 describes a method for preparing particles of expandable polystyrene which allows thermo-insulating sheets to be prepared for the building industry, having a density lower than 30 g/l but with a thermal conductivity analogous to that of traditional sheets. According to this method, particles of expandable polystyrene can be prepared, which are capable of giving articles, for example, sheets, with a density ranging from 10 to 15 g/l and a thermal conductivity which is such as to satisfy the request of class 035 of the DIN 18164, Part 1, Standard englobing in the particle itself from 0.05 to 25% by weight of graphite powder in the form of substantially spherical particles with an average diameter ranging from 0.1 to 50 µm. More specifically, the method of the U.S. patent cited above comprises polymerizing the styrene monomer, or a solution of polystyrene in styrene, in an aqueous suspension, in the presence of graphite particles and conventional reagents and/or polymerization additives. Expandable polystyrene spherical beads are thus obtained with an average diameter ranging from 0.2 to 2 mm in which the graphite in powder form is homogeneously distributed.

The Applicant has now found that it is possible to obtain expandable styrene polymers capable of providing low density expanded materials, with characteristics comparable to those of the materials obtained with the method of the known art, without having to resort to the use of an athermanous additive such as graphite which has, among other things, the defect of giving the polymer, before and after expansion, an unaesthetic grey colour, sometimes intense. It has been found, in fact, that it is possible to obtain products based on vinylaromatic polymers with a density much lower than 30 g/l and with a thermal conductivity also capable of satisfying class 035 of the DIN 18164 Part 1, Standard by substituting athermanous graphite, i.e. capable of absorbing infrared radiation, with materials having a refraction index which is sufficiently higher than that of the polymer and which are therefore capable of favouring the reflection of infrared radiation. This result is particularly interesting as it also allows a material such as titanium dioxide to be selected, which, as it is white, does not alter the colouring of the polymer, in particular polystyrene.

An object of the present invention therefore relates to expandable vinylaromatic polymers which comprise:

a) a matrix obtained by polymerizing 50-100% by weight of one or more vinylaromatic monomers and 0.50% by weight of a copolymerizable monomer;

b) 1-10% by weight, calculated with respect to the polymer (a), of an expanding agent englobed in the polymeric matrix;

c) 0.05-25% by weight, calculated with respect to the polymer (a), of an inorganic filler homogeneously distributed in the polymeric matrix with a substantially spherical granulometry, an average diameter ranging from 0.01 to 100 µm, a refraction index higher than 1.6 and a white index, as defined in "Colour Index" (third edition published by The Society of Dyers and Colourists, 1982), equal to or lower than 22.

The term "vinylaromatic monomer", as used in the present description and claims, essentially refers to a product which corresponds to the following general formula:

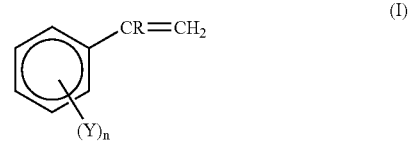

wherein R is a hydrogen or a methyl group, n is zero or an integer ranging from 1 to 5 and Y is a halogen, such as chlorine or bromine, or an alkyl or alkoxyl radical having from 1 to 4 carbon atoms.

Examples of vinylaromatic monomers having the general formula defined above are: styrene, α-methylstyrene, methylstyrene, ethylstyrene, butylstyrene, dimethylstyrene, mono-, di-, tri-, tetra-and penta-chlorostyrene, bromostyrene, methoxy-styrene, acetoxy-styrene, etc. Preferred vinylaromatic monomers are styrene and α-methylstyrene.

The vinylaromatic monomers having general formula (I) can be used alone or in a mixture of up to 50% by weight with other copolymerizable monomers. Examples of these monomers are (meth)acrylic acid, $C_1$-$C_4$ alkyl esters of (meth)acrylic acid, such as methyl acrylate, methylmethacrylate, ethyl acrylate, ethylmethacrylate, isopropyl acrylate, butyl acrylate, amides and nitriles of (meth)acrylic acid such as acrylamide, methacrylamide, α-rylonitrile, methacrylonitrile, butadiene, ethylene, divinylbenzene, maleic anhydride, etc. Preferred copolymerizable monomers are acrylonitrile and methylmethacrylate.

Any expanding agent capable of being englobed in the vinylaromatic polymeric matrix, can be used in a combination with the vinylaromatic polymers object of the present invention. Typical examples are aliphatic hydrocarbons, freon, carbon dioxide, water, etc.

The inorganic filler with a refraction index higher than 1.6, preferably from 1.6 to 3, extremes included, and with a white index equal to or lower than 22, preferably between 21 and 5, extremes included, can be added to the vinylaromatic polymer both by polymerization in suspension and by means of the continuous mass technique, in such quantities as to give a final concentration in the polymer ranging from 0.05-25% by weight, preferably from 0.5 to 8%. The granulometry of the filler preferably ranges from 0.1 to 50 µm. The preferred inorganic filler is represented by titanium dioxide and barium sulfate.

At the end of the addition of the filler, an expandable polymer is obtained, which can be transformed to produce expanded articles having a density ranging from 5 to 50 g/l, preferably from 10 to 25 g/l. These materials also have an excellent thermal insulation capacity expressed by a thermal conductivity ranging from 25 to 50 mW/mK, preferably from 30 to 45 mW/mK which is generally on an average even over 10% lower than that of equivalent non-filled expanded materials currently on the market, for example EXTIR A-5000 of EniChem S.p.A., as illustrated in Tables 1 and 2 enclosed. Thanks to these characteristics of the expandable polymers object of the present invention, it is possible to prepare thermo-insulating articles with significant material savings or, for example, to prepare sheets having a lesser thickness than those produced with traditional non-filled polymers, with a consequent reduction in space.

Conventional additives, generally used with traditional materials, such as pigments, stabilizers, flame-retardants, antistatic agents, detaching agents, etc. can be added to the expandable polymers object of the present invention.

A further object of the present invention relates to the processes for the preparation of expandable polymers with an improved thermal conductivity, after expansion, with a density lower than 30 g/l.

In particular, a further object of the present invention relates to a process for preparing expandable vinylaromatic polymers which comprises polymerizing in aqueous suspension one or more vinylaromatic monomers, optionally together with at least one polymerizable comonomer in a quantity of up to 50% by weight, in the presence of an inorganic filler with a substantially spherical granulometry, an average diameter ranging from 0.01 to 100 µm, a refraction index higher than 1.6 and a white index, as defined in "Colour Index" (third edition published by The Society of Dyers and Colourists, 1982), equal to or lower than 22, and an expanding agent added before, during or after the end of the polymerization.

At the end of the polymerization, substantially spherical polymer beads are obtained, with an average diameter ranging from 0.2 to 2 mm, inside which the inorganic additive is homogeneously dispersed.

During the polymerization in suspension, polymerization additives, typically used for producing expandable vinylaromatic polymers, are adopted, such as peroxide initiators, stabilizing agents of the suspension, chain transfer agents, expanding aids, nucleating agents, plasticizers, etc. In particular, it is preferable to add flame-retardant agents during the polymerization, in a quantity ranging from 0.1% to 8% by weight, with respect to the weight of the resulting polymer. Flame-retardant agents particularly suitable for the expandable vinylaromatic polymers, object of the present invention, are brominated aliphatic, cycloaliphatic, aromatic compounds such as hexabromocyclododecane, pentabromomonochlorocyclohexane and pentabromophenyl allyl ether.

The expanding agents are preferably added during the polymerization phase and are selected from aliphatic or cycloaliphatic hydrocarbons containing from 3 to 6 carbon atoms such as n-pentane, isopentane, cyclopentane or their mixtures; the halogenated derivatives of aliphatic hydrocarbons containing from 1 to 3 carbon atoms such as, for example, dichlorodifluoromethane, 1,2,2-trifluoroethane, 1,1,2-trifluoroethane; carbon dioxide and water.

To improve the stability of the suspension, it is possible to use a solution of vinylaromatic polymer in the monomer, or mixture of monomers, in which the concentration of polymer ranges from 1 to 30% by weight, preferably from 5 to 20%. The solution can be obtained either by dissolving a preformed polymer (for example fresh polymer or the waste products of previous polymerizations and/or expansions) in the monomer or by pre-polymerizing the monomer, or mixture of monomers, in mass, in order to obtain the above concentrations, and then continuing the polymerization in aqueous suspension in the presence of the remaining additives.

Another object of the present invention relates to a process for preparing in mass and in continuous, expandable vinylaromatic polymers, which comprises the following steps in series:

i. feeding a vinylaromatic polymer, as described above, to an extruder, together with an inorganic filler, having a substantially spherical granulometry, an average diameter ranging from 0.01 to 100 µm, a refraction index higher than 1.6 and a white index, as defined in "colour Index" (third edition published by The Society of Dyers and Colourists, 1982), equal to or lower than 22;

ii. heating the vinylaromatic polymer to a temperature higher than the relative melting point;

iii. injecting the expanding agent and possible additives such as flame-retardant agents, into the molten polymer before extrusion through a die; and iv. forming expandable beads, through a die, in a substantially spherical form with an average diameter ranging from 0.2 to 2 mm.

A detailed method for preparing vinylaromatic polymers in mass and in continuous is provided in European patent EP 126,459.

At the end of the polymerization, either it be carried out in suspension or in continuous mass, the expandable beads produced are subjected to pre-treatment generally applied to conventional expandable beads and which essentially consists in:

1. coating the beads with a liquid antistatic agent such as amines, tertiary ethoxylated alkylamines, ethylene oxide-propylene oxide copolymers, etc. The purpose of this agent is to facilitate both the adhesion of the "coating" and also the screening of the beads prepared in suspension;

2. applying the "coating" to the above beads, said coating essentially consisting of a mixture of mono-, di- and tri-esters of glycerin (or other alcohols) with fatty acids and of metallic stearates such as zinc and/or magnesium stearate.

Alternatively, the inorganic filler can also be added in the coating, together with the mixture of esters.

Some illustrative but non-limiting examples are provided for a better understanding of the present invention and for its embodiment.

EXAMPLE 1

A mixture of 150 parts by weight of water, 0.1 parts of sodium pyrophosphate, 100 parts of styrene, 0.15 parts of benzoyl peroxide, 0.25 parts of ter-butyl perbenzoate and 1 part of titanium dioxide with a substantially spherical granulometry and an average diameter of about 0.2 µm, are charged into a closed, stirred container. The mixture is heated to 90° C. under stirring.

After about 2 hours at 90° C., 4 parts of a solution at 10% of polyvinylpyrrolidone are added. The mixture is heated, under stirring, for a further 2 hours to 100° C., 7 parts of a 70/30 mixture of n-pentane and i-pentane are added and the mixture heated for a further 4 hours to 125° C.

The beads of expandable polymer thus produced are subsequently recovered, washed with deionized water, dried in a stream of warm air, added with 0.02% of ethoxylated amine, and screened by separating the fraction with a diameter ranging from 1 to 1.5 mm.

0.2% of glycerylmonosterate and 0.05% of magnesium stearate are then added to the fraction.

The product is pre-expanded with vapour at a temperature of 100° C. for three contact times and aged for a day (density in Table 1).

A part of the beads is expanded a second time to reach even lower densities.

Both the beads expanded once only and those expanded twice were used for the moulding of blocks (dimensions 1040×1030×550 mm) at a pressure of 0.4 bars, and the cooling time was measured (data in Table 2-sheet 1).

The blocks were then evaluated (shrinkage, or the difference between the volume of the block and the volume of the mould) and cut to prepare flat sheets for measuring the sintering and thermal conductivity. The thermal conductivity was 36.7 mW/mK whereas that of a sheet having the same density prepared with a traditional non-filled reference product (EXTIR A-5000), was 42.5 mW/mK.

Table 2 indicates the physical characteristics of an expanded polystyrene block obtained with the expandable beads, object of the present invention, in a first and second expansion and compared with an analogous block obtained from the commercial reference product. The block obtained with the beads object of the present invention surprisingly shows a drastic increase in the sintering degree.

EXAMPLE 2

A polystyrene having a Melt Index of 10 g/10' at 200° C./5 kg premixed with titanium dioxide alone (2 and 4%) in a first phase, and with barium sulfate alone (2%) in a second phase, is fed into a twin-screw extruder equipped with a feeding hopper. After bringing the polymer to the molten state, 6 parts of a mixture of n-pentane/1-pentane with a weight ratio of 70/30, are injected.

The resulting mass is drawn through an extrusion head equipped with holes. The polymer emerging from the holes is cut by a series of rotating knives in contact with the surface of the die in order to obtain substantially spherical beads having an average diameter of about 1.2 mm. The die is immersed in a water bath.

The beads are sent by the stream of water, cooled to 35° C., separated from the water and dried in a stream of warm air.

Ethoxylated amine and the coating are then added to the beads as described in Example 1.

The expansion and moulding were effected as described in Example 1. The thermal conductivity was about 36 and 35.5 mW/mK with 2 and 4% respectively of titanium dioxide.

The thermal conductivity value of 36.7 mW/mK was obtained, on the other hand with a flat sheet containing 2% by weight of $BaSO_4$, with a density however of 17 g/l.

Table 2 indicates the physical characteristics of expanded blocks obtained from expandable beads modified with tita-nium dioxide. Also in these cases, the blocks obtained with the beads, object of the present invention, show a drastic increase in the sintering degree with respect to the reference block.

TABLE 1

|  | Contact time (min.) | Density (g/l) |
|---|---|---|
| Reference | 1 | 20.5 |
|  | 2 | 17.2 |
|  | 3 | 15.5 |
| Example 1 (1% $TiO_2$) | 1 | 19.5 |
|  | 2 | 15.6 |
|  | 3 | 14.2 |

| Sheets | DENSITY | THERMAL CONDUCTIVITY (mW/mK) |
|---|---|---|
| Reference | 14 g/l | 42.5 |
| Sheet 1 (1% $TiO_2$) | 14 g/l | 36.7 |
| Sheet 2 (2% $TiO_2$) | 14 g/l | 36 |
| Sheet 3 (4% $TiO_2$) | 14.4 g/l | 35.5 |

TABLE 2

| Blocks from beads of first and second expansion | | |
|---|---|---|
| Reference | | |
| Density (g/l) | 16.5 | 7.8 |
| Cooling time | 30' | 2' 30" |
| Shrinkage (mm) | −7 | −5 |
| Sintering (%) | 15 | 20 |
| Sheet 1 (1% $TiO_2$) | | |
| Density (g/l) | 15 | 8.3 |
| Cooling time | 25' | 2' 30" |
| Shrinkage (mm) | −2 | −3 |
| Sintering (%) | 85 | 35 |
| Sheet 2 (2% $TiO_2$) | | |
| Density (g/l) | 18.1 | 8 |
| Cooling time | 30' | 2' |
| Shrinkage (mm) | −4 | −4 |
| Sintering (%) | 80 | 30 |
| Sheet 3 (4% $TiO_2$) | | |
| Density (g/l) | 15 | 8.4 |
| Cooling time | 25' | 2' 30" |
| Shrinkage (mm) | −2 | −4 |
| Sintering (%) | 80 | 40 |

The invention claimed is:

1. A method of using an inorganic filler having a substantially spherical granulometry, an average diameter of from 0.01 to 100 μ, a refraction index higher than 1.6 and a white index of 22 or less as defined in "Colour Index", third edition published by The Society of Dyers and Colourists, 1982, said method comprising:

polymerizing one or more vinylaromatic monomers in an aqueous suspension polymerization in the presence of the inorganic filler;

forming substantially spherical beads of a polymer which comprise the inorganic filler homogeneously dispersed in the entire bead, and adding an expanding agent to the aqueous suspension polymerization before, during or after the polymerizing.

2. The method according to claim 1, wherein the aqueous suspension further comprises one or more co-monomers in an amount of up to 50% by weight based on the total weight of the monomers.

3. The method according to claim 1, wherein the polymerizing is carried out to form substantially spherical beads have an average diameter of from 0.2 to 2 mm.

4. The method according to claim 1, further comprising:
adding one or more flame-retarding agents to the aqueous suspension polymerization in an amount of from 0.1 to 8% by weight based on the weight of a polymer formed in the process, during the polymerizing.

5. The method according to claim 4, wherein the flame-retarding agent is at least one selected from the group consisting of a brominated aliphatic compound, a cycloaliphatic compound and an aromatic compound.

6. The method as claimed in claim 1, wherein the expanding agent is added during the polymerizing and the expanding agent is at least one selected from the group consisting of an aliphatic hydrocarbon, a cycloaliphatic hydrocarbon containing from 3 to 6 carbon atoms, a halogenated derivative of an aliphatic hydrocarbon containing from 1 to 3 carbon atoms, carbon dioxide, water and mixtures thereof.

7. The method according to claim 1, wherein the polymerizing is carried out as an aqueous suspension polymerization wherein the concentration of a polymer formed by the polymerizing is from 1-30% by weight.

8. The method of using according to claim 1, further comprising:
pre-treating the beads by
(i) coating the beads with a liquid anti-static agent;
(ii) applying a coating to the treated beads wherein the coating comprises a mixture of mono-, die- and tn-esters of glycerin with one or more fatty acids and one or more metallic stearates.

9. The method of using according to claim 8, wherein the liquid anti-static agent is at least one selected from the group consisting of an amine, a tertiary ethoxylated alkylamine, and an ethylene oxide-propylene oxide co-polymer.

10. The method of using according to claim 9, wherein the coating further comprises the inorganic filler.

11. The method of using according to claim 8, wherein the metallic stearate is at least one selected from the group consisting of zinc stearate and magnesium stearate.

12. The method according to claim 1, further comprising:
foaming the beads to form a thermo-insulating article having a density ranging from 5 to 50 g/l and a thermal conductivity ranging from 25 to 50 mW/mK.

13. The method according to claim 12, wherein the thermo-insulating article has a density of from 10 to 25 g/l and a thermal conductivity of from 30 to 45 mW/mK.

14. A method for making a thermo-insulating article, comprising:
polymerizing one or more vinylaromatic monomers in an aqueous suspension polymerization in the presence of the inorganic filler to form a vinylaromatic polymer;

forming substantially spherical beads of the vinylaromatic polymer, wherein the inorganic filler is homogeneously dispersed in the entire substantially spherical beads of the vinylaromatic polymer, adding an expanding agent to the aqueous suspension polymerization before, during or after the polymerizing, and foaming the substantially spherical beads of the vinylaromatic polymer to form the thermo-insulating article, wherein the thermo-insulating article has a density of from 5 to 50 g/l and a thermal conductivity of from 25 to 50mW/mK, wherein the inorganic filler has a substantially spherical granulometry, an average diameter of from 0.01 to 100 μ, a refraction index higher than 1.6 and a white index of 22 or less as defined in "Colour Index", third edition published by The Society of Dyers and Colourists, 1982.

* * * * *